Jan. 12, 1965 J. E. THORNTON ETAL 3,165,584
DIGITAL COMMUNICATION SYSTEM WITH DETECTOR SELECTION
MEANS RESPONSIVE TO DATA POLARITY TRANSITIONS
Filed Oct. 29, 1962 3 Sheets-Sheet 1

INVENTORS
JAMES E. THORNTON
ERNEST J. HOOD
BY Cushman, Darby & Cushman
ATTORNEYS INVENTORS
JAMES E. THORNTON
ERNEST J. HOOD
BY
Cushman, Darby & Cushman
ATTORNEYS Jan. 12, 1965 J. E. THORNTON ETAL 3,165,584

DIGITAL COMMUNICATION SYSTEM WITH DETECTOR SELECTION MEANS RESPONSIVE TO DATA POLARITY TRANSITIONS

Filed Oct. 29, 1962 3 Sheets-Sheet 3

INVENTORS
JAMES E. THORNTON
ERNEST J. HOOD
BY
Cushman, Darby & Cushman
ATTORNEYS 3,165,584
DIGITAL COMMUNICATION SYSTEM WITH DETECTOR SELECTION MEANS RESPONSIVE TO DATA POLARITY TRANSITIONS

James E. Thornton, St. Paul, and Ernest J. Hood, Minneapolis, Minn., assignors to Control Data Corporation, Minneapolis, Minn., a corporation of Minnesota Filed Oct. 29, 1962, Ser. No. 233,778
9 Claims. (Cl. 178—68)

This invention relates to a communications system and more particularly to a method and apparatus for transmitting and receiving digital phase modulated information.

The availability of digital computers and the necessity for processing large amounts of information has led to communications systems in which computers are interconnected. Theoretically such systems are ideally suited to the purpose of collecting messages from various sources, at various rates, and in various codes, consolidating such information in one computer and transmitting it at high speeds to another computer where the messages are sorted and delivered.

Modern computers process information at rates in excess of one million bits per second. However, problems are created in interconnecting two or more computers operating asynchronously at such high information processing rates. Although communication channels are readily available with sufficient capacity for such transmission, difficulties have been encountered in providing terminal equipment to connect computers to such channels so as to operate satisfactorily without limiting the rate of transmission.

This shortcoming has been overcome by the communication system of this invention which provides a digital phase modulator which prepares information for transmission over a high speed transmission channel to a receiver which includes a detector capable of operation at rates of several million bits per second.

Another object of this invention is to provide a communication system in which identification of information within the detector is determined by its polarity, and the detector operation is internally synchronized by the information on which it operates rather than by external timing means.

A further object of this invention is to provide a system compatible with several high speed transmission channels such as coaxial cable, standard wide-band television or microwave channels, etc.

The foregoing objects are accomplished in a preferred embodiment by providing a phase modulator which converts digital information in a first format to a second format having polarity transitions at constant intervals. This modulated information is received by a detector which is internally timed by these polarity transitions to appropriately select bistable devices in accordance with the polarity of a portion of each information element received in the second format.

Other objects and advantages will be apparent from the following description of the invention, pointed out particularly in the appended claims, when the foregoing are taken in connection with the accompanying drawings of an illustrative embodiment of the invention in which:

Figures 1, 2, 5:
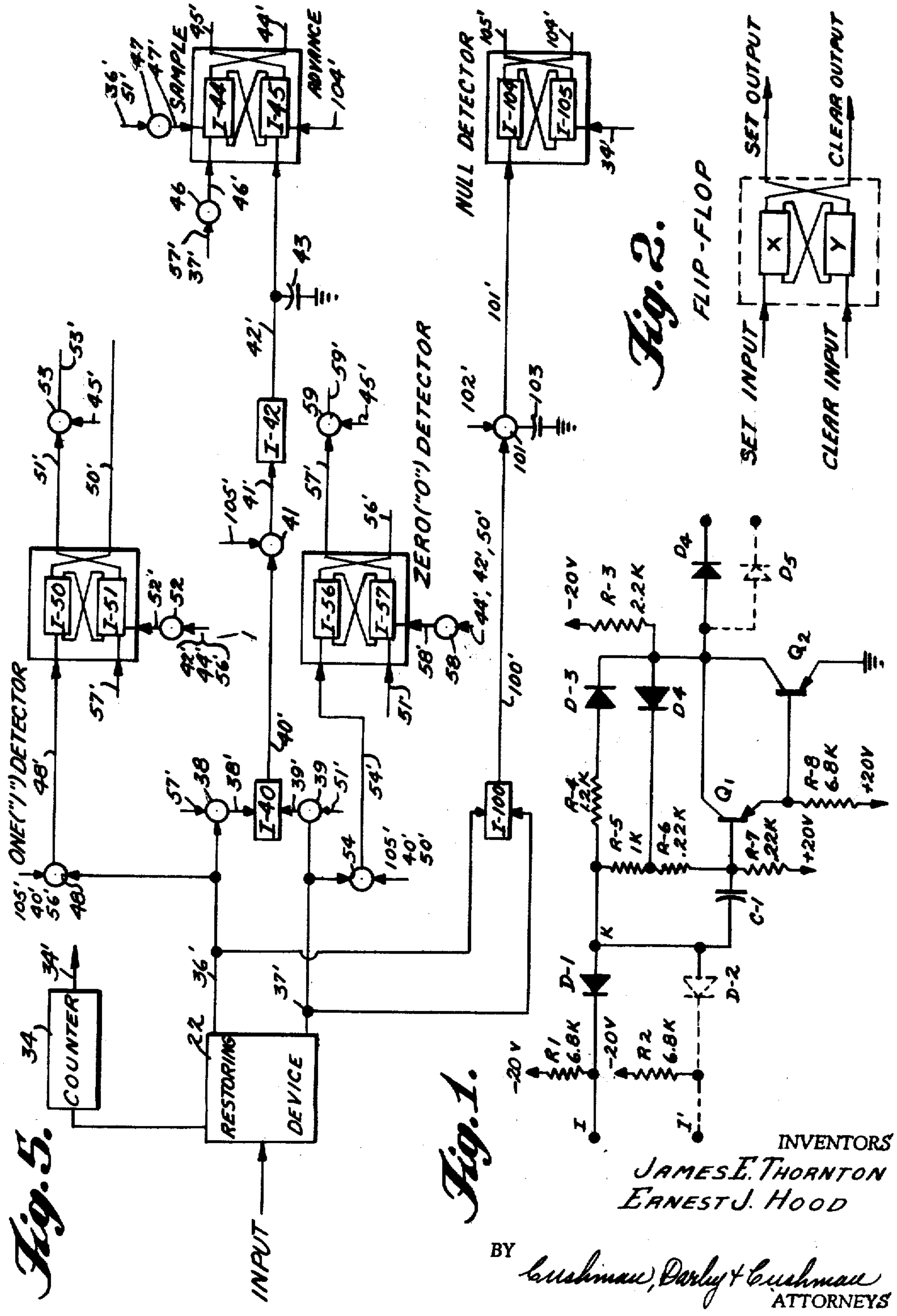
FIGURE 1 is a schematic diagram of the single inverter which comprises a basic building block of the communications system.
FIGURE 2 is a diagram in block form illustrating the interconnections of a pair of inverters to form a flip-flop.
FIGURE 5 is a diagram in block form of the detector circuit for demodulating the phase modulated signal.

Before proceeding with the description of the communication system as a whole, the inverter and flip-flop arrangements which comprise the basic components thereof will first be described. The single inverter is shown in FIGURE 1. It will be assumed that two information voltage levels are used in the system in which this invention operates. The voltage levels are —3.0 volts, representing the logical "1," and —0.5 volt, representing the logical "0." The values for the parameters of the circuit shown in FIGURE 1 have been established as those required for operation using these two voltage levels. However, it should be noted these values have been chosen for purposes of illustrating the circuit operation and should be in no way construed as a limitation to a single embodiment of the circuit.

In operation, the logical function of the single inverter is to invert one of the values of input voltage levels to the second voltage level at the output of the circuit. In accomplishing this, transistor Q1 is connected as an emitter follower and Q2 as an amplifier. The collector circuits of the transistors are provided with two feedback loops, which include diodes D–3 and D–4, which prevent the transistors from being driven to cutoff or saturation. This results in a switching action from conduction in one state to conduction in another which is accomplished in a minimum time of 50 millimicroseconds and a maximum time of 100 millimocroseconds. Resistors R3–R7 serve as a voltage divider network and capacitor C1 provides rapid coupling of input signals to Q1. The input to the inverter is applied at I. A plurality of inputs may be utilized by incorporating additional circuitry as shown by the dotted lines connected to point K for each additional input. The output of the circuit is taken at the common collector junction of Q1 and Q2. A single output line, such as that including diode D–4 may be utilized or additional output lines, such as that incorporating D–5 shown in dotted lines, may be employed. Inputs of —3.0 volts or —0.5 volt applied to the voltage divider network by isolation diodes D–1 and D–2, etc. vary the voltage at the base of Q1 to control the conduction of Q1 and Q2 to develop the output voltage across R3. The two feedback loops to the base of Q1, each of which contains a diode D–3 or D–4, prevent transistors Q1 and Q2 from being driven to cutoff or saturation by establishing positive-going and negative-going limits for the base voltage swings of Q1. On application of −0.5 volt input, the feedback loop through D–3 holds the base of Q1 at a sufficiently negative voltage to permit some conduction of Q1 and Q2 producing a −3.0 volt output. Similarly, on application of −3.0 volt input, the feedback path through D–4 prevents the base of Q1 from becoming so negative that saturation occurs. Consequently, a −0.5 volt output is produced.

It should be noted that utilizing a plurality of inputs with the single inverter described, a logical "1" output may only be realized when all the inputs are logical "0's" (−0.5 volt).

As stated previously, the single inverter just described may be utilized in the detector by itself or in conjunction with a second similar inverter to form a bistable device hereinafter referred to as a "flip-flop." The arrangement of the two inverters to form such a flip-flop will now be described. For the sake of simplicity of the description, a block diagram will be employed.

Referring to FIGURE 2, a pair of single inverters X and Y are shown. These are of the type shown in FIGURE 1. Each of these inverters is illustrated as having two input and two output lines, as explained in regard to FIGURE 1, although it is understood that additional lines may be provided. Inverters X and Y are interconnected such that an output of X is connected to an input of Y and vice versa. In addition an input designated as a "Set Input" is connected from an external source to a second input of X and a "Clear Input" is similarly connected to Y. Second output leads from both X and Y are crossed over to provide flip-flop output lines designated as "Set Output" from inverter Y and "Clear Output" from inverter X.

It will be understood that the flip-flop will be "set" by a logical "1" input to the Set Input line and "cleared" by a logical "1" input to the Clear Input line. In the particular flip-flop circuit employed herein, the presence of a "1" pulse on the Set Input line operates inverter X to produce a "0" on the Clear Output line while simultaneously feeding back a "0" to an input of inverter Y. This "0" input produces a "1" at the output of inverter Y which is fed back to the other input line of inverter X while simultaneously appearing on the Set Output line. When the set input returns to "0," the feedback connection between inverters X and Y permits the storage of the state to which the "1" pulse on the Set Input line forced the flip-flop. Should the Clear Input line later receive a "1" pulse, the output of inverter Y becomes "0," and therefore the feedback input to inverter X is "0." Inverter X then produces a "1" output which appears on the Clear Output line and which is fed back to inverter Y to maintain the flip-flop in this condition when the "1" pulse on the Clear Input line is removed. It is apparent that the Set and Clear Inputs are never "1" at the same time.

Figures 3, 4:
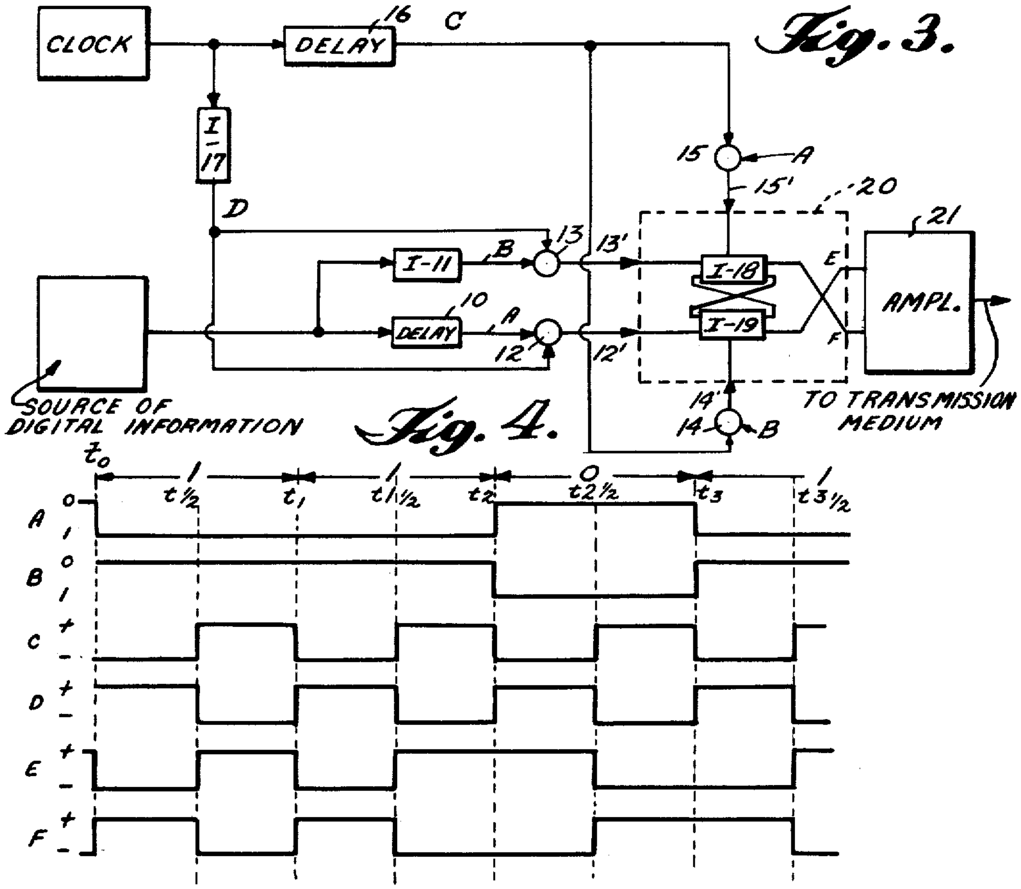
FIGURE 3 is a diagram in block form of the circuit for the phase modulator.
FIGURE 4 is a graph illustrating waveforms produced at different points during operation of the phase modulator.

Referring to FIGURE 3 a block diagram of the circuit for phase modulating elements of digital information prior to transmission is shown. The operation of this circuit will become apparent in the following description of operation taken in conjunction with the waveforms shown in FIGURE 4.

An input of digital information from any suitable source such as the magnetic storage device of a computer is supplied in a first format as inputs of a delay line 10 and an inverter I–11. The outputs from the devices, shown in FIGURE 4 as A and B respectively are each connected as an input to AND gates, gates 12 and 13 as illustrated. The delay circuit 10 is matched to the inherent time delay of the inverter such that at the output of the inverter I–11, there appears a signal B which is 180° out of phase with signal A appearing at the output of the delay line. The signals A and B are also connected as inputs to AND gates 15 and 14 respectively.

The output of a suitable clock is also applied as inputs to a delay line 16 and as inverter I–17. The respective outputs from this delay line and inverter are shown as C and D in FIGURE 4. Just as described above relative to signals A and B, signals C and D are 180° out of phase with one another. Output C is connected as an input to AND gates 15 and 14, and signal D is applied as an input to AND gates 12 and 13.

It should here be noted that signals A and B are of the non-return to zero type each bit of which has a length of time "$t$." Also the clock-produced signals C and D complete one cycle in a time "$t$." The system is timed such that signals A, B, C and D are synchronized, as shown at time $t_0$.

The outputs 13′ and 15′ of AND gates 13 and 15 are connected as inputs to inverter I–18 and the outputs 12′ and 14′ of AND gates 12 and 14 serve as inputs to inverter I–19. These two inverters are interconnected as shown to form the flip-flop 20 shown in dash lines. The output line from inverter I–19 serves as the set-output line of the flip-flop, and the output line from inverter I–18 serves as the clear-output line. Signals E and F which appear on these lines are connected to a suitable amplifier circuit 21 to transform the logical output from the flip-flop to a condition suitable for transmission to the receiver.

The operation of the phase modulator will now be described. An input signal of the binary number "1101" will be used as a sample of information in a first format which will be modulated. At time $t_0$ logical "1's" are applied to AND gate 15 to open this gate passing a "1" to inverter I–18. Assuming that the flip-flop 20 is cleared prior to time $t_0$, the flip-flop will now be set to produce a "1" on the set-output line as shown at E. This condition will remain until $t_{1/2}$ when gate 12 opens to pass a "1" to inverter I–19 clearing the flip-flop returning E to "0" and changing F to a "1." At $t_1$, gate 15 passes a "1" to inverter I–18 thereby setting the flip-flop, and again at $t_{1\,1/2}$ gate 12 is opened to a "1" to clear flip-flop 20. At time $t_2$, however, gate 14 is opened to pass a "1," but since the flip-flop is already cleared E remains at "0" and F at "1." At times $t_{2\,1/2}$ AND gate 13 passes a "1" to set the flip-flop changing E from "0" to "1" and F from "1" to "0." Since the flip-flop is already set, the "1" appearing at the output of gate 15 at time $t_3$ will have no effect on the flip-flop and E will stay at "1." The logical information produced at E and F will, as stated previously, be transformed by amplifier 21 to a condition suitable for transmission to the receiver to be hereinafter described. The transmission may be by any appropriate medium such as coaxial cable, microwave, television channels, etc.

The significant logical waveforms produced by the modulator are the output E on the set-output line and output F on the clear-output line of flip-flop 20. These waveforms are in a second format comprising a plurality of bauds, a single baud being defined as that signal within the period $t_n$–$t_{n+1}$ (where $n$=zero or any integer).

Comparing delayed waveform A and waveform E it can be seen that a phase modulated digital output has been produced by the above described circuitry. A plurality of transition points constituting changes in polarity have been created at times $t_{1/2}$, $t_{1\text{-}1/2}$, $t_{2\text{-}1/2}$, etc. in the resultant waveform E. In addition it can be seen that the portions of waveform E may be observed at times $t_0$–$t_{1/2}$, $t_1$–$t_{1\text{-}1/2}$, $t_2$–$t_{2\text{-}1/2}$, etc. to determine whether the bauds represent a binary "0" or a binary "1." The transition points constituting a change in polarities will occur during a one-half baud time when modulated information is being transmitted. If the polarities of portions $t_n$–$t_{n+1/2}$ are relatively positive, then $t_n$–$t_{n+1}$ represents a binary "0" as can be seen by comparison with the corresponding time portion of waveform A which is nothing more than a delayed waveform exactly similar to that emanating from the digital source. If the polarities are negative, then a binary "1" is represented.

The detector circuit for detecting or demodulating the digital phase modulated signal produced by the modulation circuit shown in FIGURE 3 and described above is illustrated in block diagram form in FIGURE 5 of the drawings. As has been stated previously, the principal portions of this detector comprise single inverters or pairs of such inverters connected in a manner to produce a flip-flop.

Referring specifically to FIGURE 5, to the input line to which the transmitted information is supplied, there is connected a restoring device 22 which converts the digital phase modulated information from the form in which it was transmitted to the form in which it appeared at the set-output line of flip-flop 20. The restoring device, provided with a pair of output lines 36' and 37', produces waveforms which are, respectively, exactly similar to waveforms E and F on the output lines of flip-flop 20. When an absence of transmission occurs, such as a time interval between segments of the modulated information, the restoring device is at a third polarity level, that of the quiescent state. While at this level, the restoring device prepares the detector device for receiving.

Figure 6:
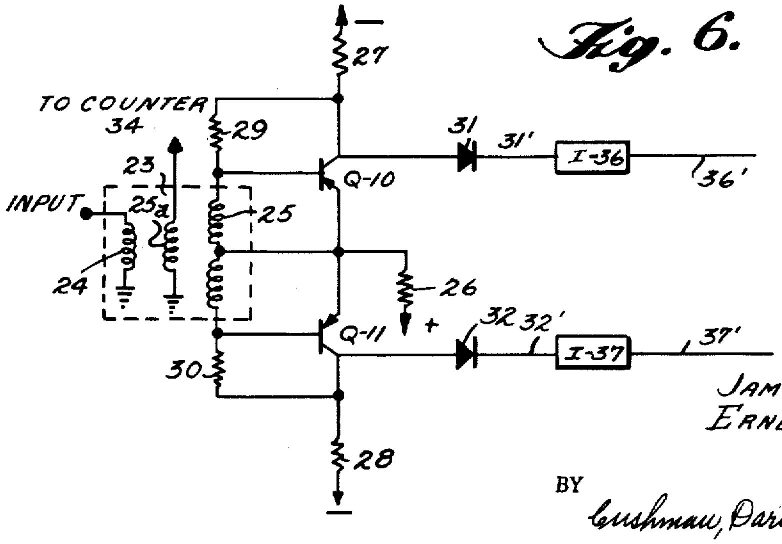
FIGURE 6 is a schematic diagram of the restoring device comprising a portion of the detector.

An exemplary embodiment of the restoring device is illustrated in FIGURE 6 of the drawings. The device comprises a transformer 23 shown in dash lines having a primary winding 24 and a center-tapped secondary 25. One end of the secondary winding 25 is connected to the base of a PNP transistor Q–10 and the other end to the base of PNP transistor Q–11. There is a common emitter connection of these transistors to the center-tap of winding 25. To this junction there is also connected a positive supply through a resistor 26. Transistors Q–10 and Q–11 are biased at their collectors by a negative source through resistors 27 and 28. A feedback resistor 29 is connected between the collector and base of Q–10, and similarly a resistor 30 is connected between the collector and base of Q–11. These resistors provide feedback voltages to insure the stability of the device. The collector of Q–10 is joined through a diode 31 to inverter I–36, and the collector of Q–11 is connected to inverter I–37 through diode 32. Inverters I–36 and I–37 have respective output lines 36' and 37' which constitute the restoring device output lines.

An appropriate connection, such as an auxiliary secondary winding 25*a*, is made from the transformer 23 to a counter 34, operable on voltage polarities of either sense on winding 25*a*, to initiate the operation of this counter as information is received by the restoring device.

The output lines 36' and 37' of the restoring device are each connected to inputs of inverter I–100 (FIGURE 5).

Output line 100' from inverter I–100 is connected to an AND gate 101 to which is also joined an input line 102' which carries an overall detector operation control signal. The signal on output line 101' of the gate 101 is integrated by condenser 103 and applied to the Null Detector flip-flop comprising inverters I–104 and I–105 interconnected as shown in FIGURE 5. This interconnection is shown by full line in the Null Detector. Output line 101' is connected to inverter I–104 of the Null Detector and to inverter I–105 thereof is connected output line 34' from counter 34. Line 34' and other output lines from flip-flops and inverters are not drawn continuously in the drawing in order to avoid confusion.

Output lines 36' and 37' are in addition connected to AND gates 38 and 39 respectively to which outputs from a Zero ("0") Detector and a One ("1") Detector, to be described below, are also applied. The output lines 38' and 39' from the AND gates are connected to an inverter I–40 from which output line 40' is connected to AND gate 41. The output on line 105' from the Null Detector is also applied to AND gate 41. Output line 41' from this gate is connected as an input to inverter I–42, the output of which is integrated by condenser 43 and applied to inverter I–45 of a Sample-Advance flip-flop comprising inverters I–44 and I–45. A second input to inverter I–45 is the signal on line 104', the clear output line of the Null Detector. To the second inverter I–44 of the Sample-Advance flip-flop there are also applied two inputs. The signals on output line 37' from inverter I–37 and the set output line 57' of the "0" Detector are applied to an AND gate 46, the signal on the output line 46' of which is a first input to inverter I–44. The second input to the inverter I–44 is the signal on output line 47' of an AND gate 47 to which is connected the output line 36' from the inverter I–36 and output line 51', the set output line of the "1" Detector.

Output line 36' is connected to an AND gate 48 in the path between inverter circuit I–36 and the "1" Detector. To this AND gate are also applied the signals on output line 40' from the inverter I–40, output line 105' from the Null Detector and the clear output line from the "0" Detector to be described below. Output line 48' is connected to inverter I–50 of the "1" Detector flip-flop. To the second inverter I–51 of this Detector there is applied the output on the set output line of the "0" Detector. An output line 52' from AND gate 52 is also connected as an input to inverter I–51. To AND gate 52 there are applied signals on output lines 44' from the Sample-Advance flip-flop, 42' from inverter I–42 and 56', the clear output line of the "0" Detector. Output line 51', the set output line of the "1" Detector, is connected to AND gate 53 to which the signal on the output line 45' from the Sample-Advance flip-flop is also applied.

Output line 37' is connected to an AND gate 54 in the path between inverter I–37 and the "0" Detector. To this AND gate are connected output line 40' from the inverter I–40, output line 105' from the Null Detector and the clear output line 50' from the "1" Detector. Output line 54' is connected to inverter I–56 of the "0" Detector flip-flop. To the second inverter I–57 of this Detector there is applied the signal on output line 51', set output line of the "1" Detector. An output line 58' from AND gate 58 is also connected as an input to inverter I–57. To AND gate 58 there are applied outputs on lines 44' from the Sample-Advance flip-flop, 42' from inverter I–42 and 50', the clear output line of the "1" Detector. Output line 57', the set output line of the "0" Detector, is connected to AND gate 59 to which the signal on output line 45' from the Sample-Advance flip-flop is also applied.

Before describing the operation of the logic portion of the detector, the functioning of the restoring device shown in FIG. 6, will be described. With no input signal at the primary winding 24, there is no voltage induced on the secondary winding 25. Transistors Q–10 and Q–11 are normally cut-off. This results from the proper choice of circuit parameters and supply voltages. With Q–10 and Q–11 cut off, the diodes 31 and 32 are reverse biased causing voltages on lines 31' and 32' to appear as logical "1's" to the inverters I–36 and I–37. Accordingly, outputs 36' and 37' are "0's." However, when a signal is applied to winding 24, a signal is induced in the secondary winding 25. This voltage across winding 25 maintains one of the transistors in the cut-off state but biases the other transistor such that it begins to conduct. As a result, the voltage at the collector of the conducting transistor rises to forward bias the associated diode. The conduction of the forward biased diode changes the "1" at its output to a "0." Consequently, with information being received, the outputs 36' and 37' are 180° out of phase. A reversal of input signal to the primary winding 24 cuts the conducting transistor off and starts the other transistor conducting thus reversing the outputs 36' and 37'. As a result, by the above-described procedure, the conditions existing on the output lines of flip-flop 20 are reproduced. In addition, the energization of the transformer 23 when information is received also commences the operation of the counter 34.

The operation of the remaining logic portion of the detector will now be described. It will be assumed that no information is being received until a time $t_6$, the time lag being an exemplary function of the transmission time.

When power is applied to the Detector, but before any data is received, the "0" Detector and the "1" Detector are in their cleared condition, logical "1's" being present on lines 56′ and 50′ of the respective Detectors and logical "0's" appear on lines 57′ and 51′. As stated previously, in terms of exemplary voltages, "0's" are −0.5 volt, and "1's" are −3.0 volts. With "0's" on lines 57′ and 51′, AND gates 38 and 39 are closed resulting in a pair of "0" inputs to inverter I–40. It will be recalled that the output of the inverters employed herein is "1" only when all the inputs thereto are "0." Accordingly, inverter I–40 has a "1" output on line 40′. However, this output on line 40′ is not applied to inverter I–42 since the Null Detector is initially cleared and a "0" output appears on its set output line 105′ which is connected to AND gate 41. Therefore, while inverter I–40 is producing a "1" output, inverter I–42 produces a "1" output which is integrated by condenser 43 and applied to inverter I–45 of the Sample-Advance flip-flop, insuring that this flip-flop is cleared. At this time there is a coincidence of "1's" at AND gates 52 and 58 of the "1" Detector and "0" Detector respectively. This results from the fact that the "1" and "0" Detectors and the Sample-Advance flip-flop are initially in a cleared condition providing "1's" on lines 50′, 56′ and 44′, and these "1's" coupled with the "1" on line 42′ complete the coincidence requirements of gates 52 and 58. The resultant "1's" on lines 52′ and 58′ have no effect on the state of the "1" and "0" Detectors since they are already cleared. Concurrent with the operation of inverters I–40 and I–42 is the action of inverter I–100. Since at this time no information is being recived, logical "0's" appear on lines 36′ and 37′. Consequently, the inverter I–100 operates causing an output "1" to appear on line 100′. Gate 101 is conditioned by a "1" on line 102′ controlling the overall detector operation. The signal passed by the gate is integrated by condenser 103 and applied via line 101′ to inverter I–104 of the Null Detector flip-flop. The integrations of "1's" by condensers 103 and 43 introduce a time delay in the actuation of inverters I–104 and I–45 respectively. When the condenser 43 associated with inverter I–45 built up a sufficient charge, there was no effect on the Sample-Advance flip-flop since it was initially in a cleared condition and the application of a "1" input on the clear input line to inverter I–45 did nothing to change its state. However, when the charge builds up sufficiently on condenser 103, the Null Detector, which was initially cleared, is switched due to the "1" input applied via line 101′ to the set input line connected to inverter I–104. This switching produces a "1" on line 105′ to open gate 41 thus applying the "1" on line 40′ from inverter I–40 to inverter I–42. Inverter I–42 transforms this input to a "0" on line 42′. This "0" has no effect on the condition of the Sample-Advance flip-flop. After these initial operations, the detector circuit remains in this condition with a "1" on line 105′ indicating that the detector is prepared to receive information. This "1" also serves as a start signal when information commences.

Summarizing the condition of the circuit at this point just prior to the receipt of information, the "0" and "1" Detectors and the Sample-Advance flip-flop are cleared and the Null Detector is set producing a "1" on its set output line 105′.

The operation of the detector circuit during the receipt of digital phase modulated information on the detector input line will now be described. To assist in understanding the sequence of operation, a timing diagram shown in FIGURE 7 has been included. It should be noted here that the key to the entire operation of the detector during receipt of information is the internal timing synchronization of the detector components afforded by the transition points of the incoming wave at $t_{6\,1/2}$, $t_{7\,1/2}$, $t_{8\,1/2}$, etc.

Figure 7:
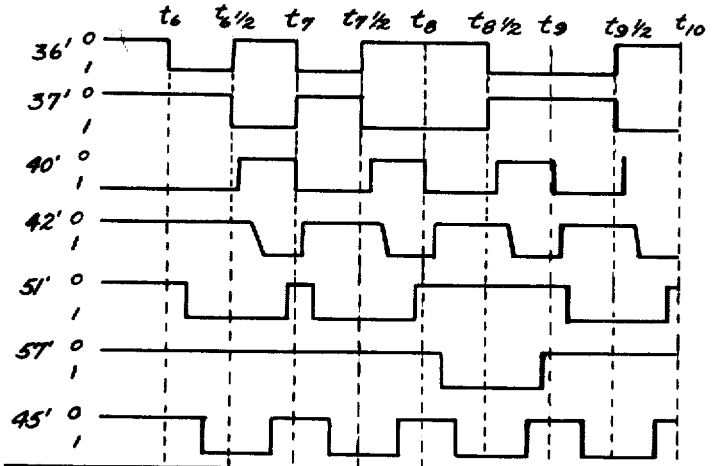
FIGURE 7 is a graph illustrating the waveforms produced at significant portions of the detector under ideal operating conditions in which the delay times of the detector are matched.

It will be assumed for purposes of illustration that the initial information input is a phase modulated signal representing the "110" portion of the "1101" signal transmitted. As stated previously, the input wavefrom has transition points, in the example assumed, at $t_{6\,1/2}$, $t_{7\,1/2}$, $t_{8\,1/2}$, etc. In all cases the polarities of the portions of the waveform from $t_n$–$t_{n+1/2}$ (where $n$=zero or any integer) may be observed to determine whether that particular $n$ cycle of waveform represents a "1" or a "0." If the polarity of portion $t_n$–$t_{n+1/2}$ is relatively positive, a "0" is represented. If relatively negative, "1" is represented. Thus, in the case of the first bit of the waveform used for illustration, as shown in FIG. 7, a "1" is present at $t_6$ on line 36′ and a "0" exists on line 37′. Since "1's" are present on output lines 105′ and 56′ of the Null and "0" Detectors respectively and on output line 40′ of inverter I–40, AND gate 48 is conditioned to pass a "1" via line 48′ to inverter I–50 of the "1" Detector. This "1" produces a switching of the "1" Detector flip-flop to its set condition whereby, due to the inherent delays in inverter operation, a "0" appears on output line 50′ followed by a "1" on line 51′. This setting of the "1" Detector conditions AND gate 47 to apply a "1" over 47′ to inverter I–44 of the Sample-Advance flip-flop. This flip-flop operates on being set to first place a "0" on line 44′ and then a "1" on line 45′. The relative delay between the operation of inverters I–51 and I–45 is shown clearly during the interval $t_6$–$t_{6\,1/2}$ in FIGURE 7 by reference to their respective output lines 51′ and 45′. The presence of "1's" on lines 45′ and 51′ conditions AND gate 53 to pass a "1" to line 53′ indicating that a "1" has been detected. Nothing further happens within the detector until the transition point at $t_{6\,1/2}$ is reached at which time the input waveform reverses to opposite polarity. At this time a "0" is present on line 36′ and a "1" on line 37′. Since the "1" Detector is set such that a "1" is present on its set output line 51′, AND gate 39 is now conditioned to pass a "1" via line 39′ to inverter I–40. The inverter operates to produce a "0" at its output line 40′. As a result, inverter I–42 is provided a "0" input which causes a "1" to appear at its output 42′. This signal is integrated by condenser 43 to produce, after a delay time determined by the condenser, a "1" at the input to inverter I–45 of the Sample-Advance flip-flop. This input clears the flip-flop first producing a "0" on set output line 45′ and a "1" on clear output line 44′. On the occurrence of a "1" on line 44′, AND gate 52 is conditioned to pass a "1" to inverter I–51 of the "1" Detector. This application of a "1" over line 52′ clears the "1" Detector producing first a "0" on the set output line 51′ and then a "1" on the clear output line 50′. When line 51′ goes to "0," AND gate 39 is no longer conditioned and a pair of "0" inputs are applied to inverter I–40 producing a "1" on its output line 40′.

It should here be noted that inverter I–40 must be converted from a "0" state to a "1" state not prior to time $t_7$. If a "1" appeared on line 40′ prior to $t_7$, gate 54 would be conditioned to set the "0" Detector. This would prevent the "1" Detector and the Sample-Advance from being simultaneously set during the period from $t_7$–$t_{7\,1/2}$. As a result, the "1" represented by the input waveform from $t_7$–$t_8$ would not be detected. The preferred form of the invention contemplates changing the state of inverter I–40 from "0" to "1" exactly at the end of each baud, time interval $t_7$, $t_8$, $t_9$, etc. This may be accomplished by proper matching of the delay characteristics of the overall detector device without the use of the integrating condenser 43. However, since such matching is not practical in all cases, the preferred embodiment illustrated utilizes the condenser 43 to obtain the proper delay timing characteristics to the circuit.

It will be appreciated that since the condition of all of the components of the circuit are precisely the same at $t_7$ as they were at $t_6$, the operation of the detector during the period from $t_7$–$t_8$ on receipt of the second "1" of the "110" message applied to the detector will be precisely the same as that from $t_6$–$t_7$.

During the interval from $t_8$–$t_9$ the "0" in the phase modulated input "110" is detected. Here the operation is similar to that described relative to period $t_6$–$t_7$ with the principal exception that the "0" Detector is set and the "1" Detector remains cleared. More specifically, a "0" phase modulated input produces a "1" on line 37' and a "0" on line 36'. This "1" is gated through AND gate 54 to set the "0" Detector. AND gate 46 is then conditioned to set the Sample-Advance flip-flop to produce a "1" on set output line 45'. This results in a "1" being gated through AND gate 59 to output line 59' indicating that a "0" has been detected. At the input wave transition time $t_{8\,1/2}$, the states of inverters I–40 are reversed in order clearing the Sample-Advance flip-flop which in turn causes "0" Detector to be cleared and the inverter I–40 to be switched from the "0" to "1" state at time $t_9$.

Figure 8:
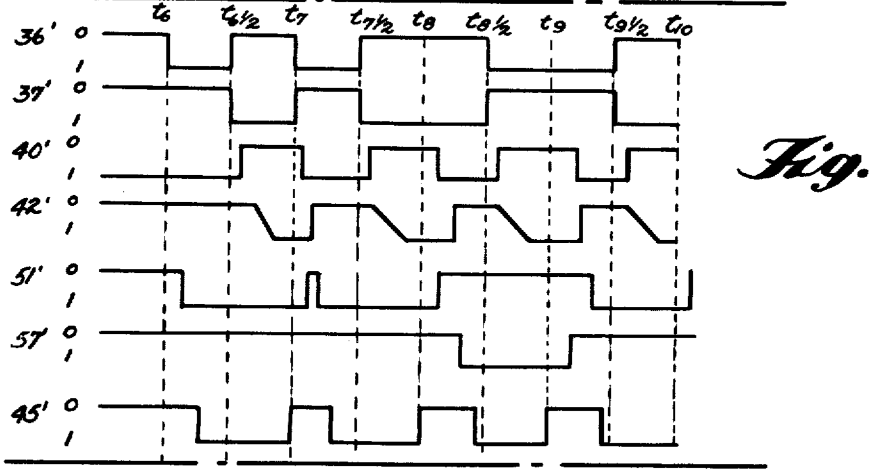
FIGURE 8 is a graph illustrating the waveforms produced at significant portions of the detector when the delay times of the detector are not perfectly matched such that inverter I–40 switches from "0" to "1" tardily.

It has been stated that to insure the proper operation of the detector, inverter I–40 must not be permitted to switch from a "0" to a "1" state prior to the end of each time interval. Such switching would allow both the "1" and "0" Detectors to be set during a single time interval and this would disrupt detection of a bit in the second interval which is similar to that of the first interval. More specifically, in the example used for illustration, the "1" to be detected during the interval from $t_7$–$t_8$ would not be detected if, during the interval from $t_6$–$t_7$ when a "1" was detected, the "0" Detector was also set. However, the converse is not true. That is, if inverter I–40 switches from "0" to "1" after the end of each time interval, proper detection still occurs. In this case, however, the wave shapes are not symmetrical as in the case where the inverter changes state at exactly the end of each interval. This is due to the fact that during some intervals the switching of inverter I–40 from "0" to "1" is dependent on the change of the incoming signal and in other intervals on the clearing of the detector selected during the previous interval. Although such operation is not herein described in detail, it will become obvious in light of the timing diagram shown in FIGURE 8 illustrating this operation taken in conjunction with the description of the functioning of the preferred embodiment detailed above.

In the system shown, the detector may be deactivated on receipt of a prescribed amount of information by means of the counter 34 reaching a desired count. At such time a "1" is produced on output line 34' which clears the Null Detector switching line 105' from a "1" to a "0" and closing AND gates leading to the "0" and "1" Detectors and the Sample-Advance flip-flop. The Null Detector cannot be reset to receive more information until a time interval occurs between the phase modulated bits. During this time interval when the restoring device is not receiving information, logical "0's" appear on the lines 36' and 37' which operates the inverter 100 causing an output "1" to appear on output line 100'. Since Gate 101 is conditioned by line 102', the capacitor 103 integrates the output line 101' passing a "1" signal to "set" the null detector. Therefore, the time interval required to "set" the null detector between the segments of the digital phase modulated information is primarily determined by the time required for capacitor 103 to charge.

Figure 9:
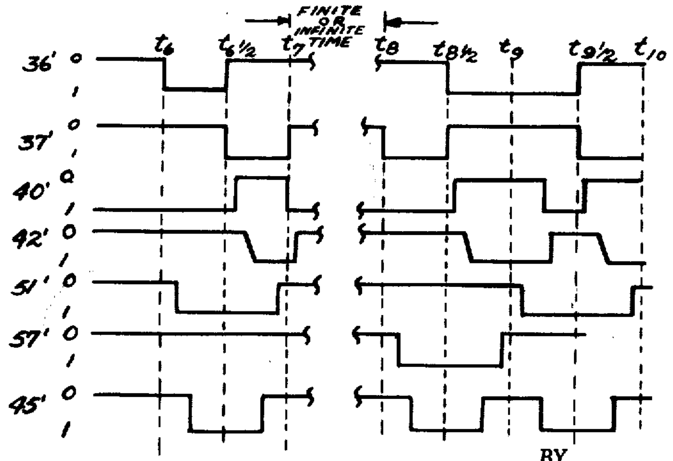
FIGURE 9 is a graph similar to that of FIGURE 7 showing waveforms when time intervals occur between phase modulated bits.

By the employment of counting means as described and selective use of the detector conditioning input 102' a finite or infinite time interval may occur between any or all of a predetermined number of phase modulated bits. Such an arrangement is displayed in the timing diagram of FIGURE 9 where the interval occurs during the period $t_7$–$t_8$.

During any time of preparation for an additional sequence of operation, the Sample-Advance flip-flop and the "0" and "1" Detectors will be insured of being in a cleared state for the beginning of the subsequent period of operation since at the end of the prior period of operation at least one of the "1" or "0" Detectors was in a cleared condition.

Although the preferred embodiment of the invention includes as part of the description of operation, a Null Detector circuit, as well as a counter arrangement for operating the same, it should be understood that these elements are not essential to the detector in that other suitable starting, stopping and timing means could be employed with equal compatability.

The structural arrangement shown is an example of a transmission and receiving system in which the inventive features of this disclosure may be utilized, and it will be readily apparent to one skilled in the art that certain modifications may be made to the system within the spirit of the invention as defined by the appended claims.

What is claimed is:

1. In a communication system for transmitting and receiving digital information, a phase modulator comprising: a source of digital information, means for inverting information from said digital source producing a signal 180° out of phase therewith, a clock device, means for inverting pulses from said clock device producing pulses 180° out of phase therewith, a first gating means having digital information and clock pulses applied as inputs thereto, a second gating means having inverted digital information and inverted clock pulses applied as inputs thereto, a third gating means having digital information and inverted clock pulses applied as inputs thereto, a fourth gating means having clock pulses and inverted digital information applied as inputs thereto, a bistable device having set-inputs and clear-input lines, and means connecting the outputs of said first and second gating means to said set-input line and the outputs of said third and fourth gating means to said clear-input line.

2. In a communication system for transmitting and receiving elements of information at two polarities, a phase modulator for converting said information from a first format to a second format having polarity transitions at predetermined intervals, means for detecting the information in said second format comprising: a plurality of bistable devices, at least one of said bistable devices responsive to each polarity, and selecting means responsive to said transitions to select appropriate bistable devices for each element of information.

3. In the communication system as set forth in claim 2: said transitions occurring at predetermined intervals corresponding to the mid-points of each of the elements of said first format.

4. In a communication system for transmitting and receiving digital information elements at two polarities, a phase modulator for converting said information from a first format to a second format having polarity transition points at predetermined intervals, means for detecting the information in said second format comprising: a pair of bistable devices, one of said bistable devices responsive to information at one polarity and the other of said bistable devices responsive to information at the second polarity, inverter means responsive to said transitions to select the appropriate bistable device for each element of information.

5. In the communication system as set forth in claim 4: said transitions occurring at predetermined intervals corresponding to the mid-points of each of the elements of said first format.

6. In a communication system for transmitting and receiving information elements at two polarities, a first detector responsive to information of one polarity, a second detector responsive to information of the other polarity and means responsive to polarity transitions of said information for conditioning said first and second detector elements.

7. In the communication system as set forth in claim 6: said detectors being bistable devices.

8. In a communication system for transmitting and receiving information elements at two polarities, a first detector means for detecting information at one polarity, a second detector means for detecting information at the other polarity and means responsive to both polarity and a polarity transition intermediate the beginning and end of the period of a single information element for selecting one of said detector means.

9. A system as in claim 8 and further including means responsive to a signal at a third polarity for indicating a time interval between elements of information.

References Cited by the Examiner

UNITED STATES PATENTS

| | | | |
|---|---|---|---|
| 2,912,684 | 11/59 | Steele | 178—67 XR |
| 3,008,124 | 11/61 | Warnock | 178—66 XR |

DAVID G. REDINBAUGH, *Primary Examiner*.